United States Patent [19]

Mayne

[11] 4,441,683

[45] Apr. 10, 1984

[54] MUSICAL INSTRUMENT HOLDER FOR ATTACHMENT TO VERTICAL AND HORIZONTAL SURFACES

[76] Inventor: Richard G. Mayne, 1701 W. Pecos Ave., Mesa, Ariz. 85202

[21] Appl. No.: 379,176

[22] Filed: May 17, 1982

[51] Int. Cl.³ .......................................... F16M 13/00
[52] U.S. Cl. .................................. 248/558; 248/121; 248/126; 248/207; 248/226.4
[58] Field of Search .................. 248/558, 207, 441 B, 248/126, 470, 471, DIG. 11, 226.4, 121

[56] References Cited

U.S. PATENT DOCUMENTS

| 874,014 | 12/1907 | Kurtzon | 248/222.4 X |
|---|---|---|---|
| 1,387,415 | 8/1921 | Lee | 248/207 X |
| 1,499,102 | 6/1924 | Farber | 248/126 |
| 1,554,055 | 9/1925 | White | 248/207 |
| 1,773,237 | 8/1930 | Naujoks | 248/121 X |
| 1,912,864 | 6/1933 | Stannard | 211/151 X |
| 2,153,821 | 4/1939 | Walberg | 248/121 |
| 2,522,345 | 9/1950 | Cashiopp | 248/121 X |
| 3,289,217 | 12/1966 | Glover | 248/226.4 |
| 4,159,092 | 6/1979 | Delano | 248/441 B |

Primary Examiner—J. Franklin Foss
Assistant Examiner—David L. Talbott
Attorney, Agent, or Firm—Warren F. B. Lindsley

[57] ABSTRACT

A musical instrument holder is disclosed, especially useful for large, heavy, cumbersome or easily dented instruments such as Sousaphones and Tubas. The holder is convertible from use as a wall-hanging holder or rolling-stand holder to a ready-access holder attachable to horizontal surfaces of various thicknesses, such as chairs or benches at the performance site. The wall hanging holder includes a wall-mount, however, the wall hanging holder can be quickly detached and converted into the ready-access holder. The ready access holder for attachment to horizontal surfaces includes means for securing the holder to the horizontal surface which comprises a means of lateral stabilization, and a primary instrument-holding means equally usable in either the horizontal or vertical position.

3 Claims, 5 Drawing Figures

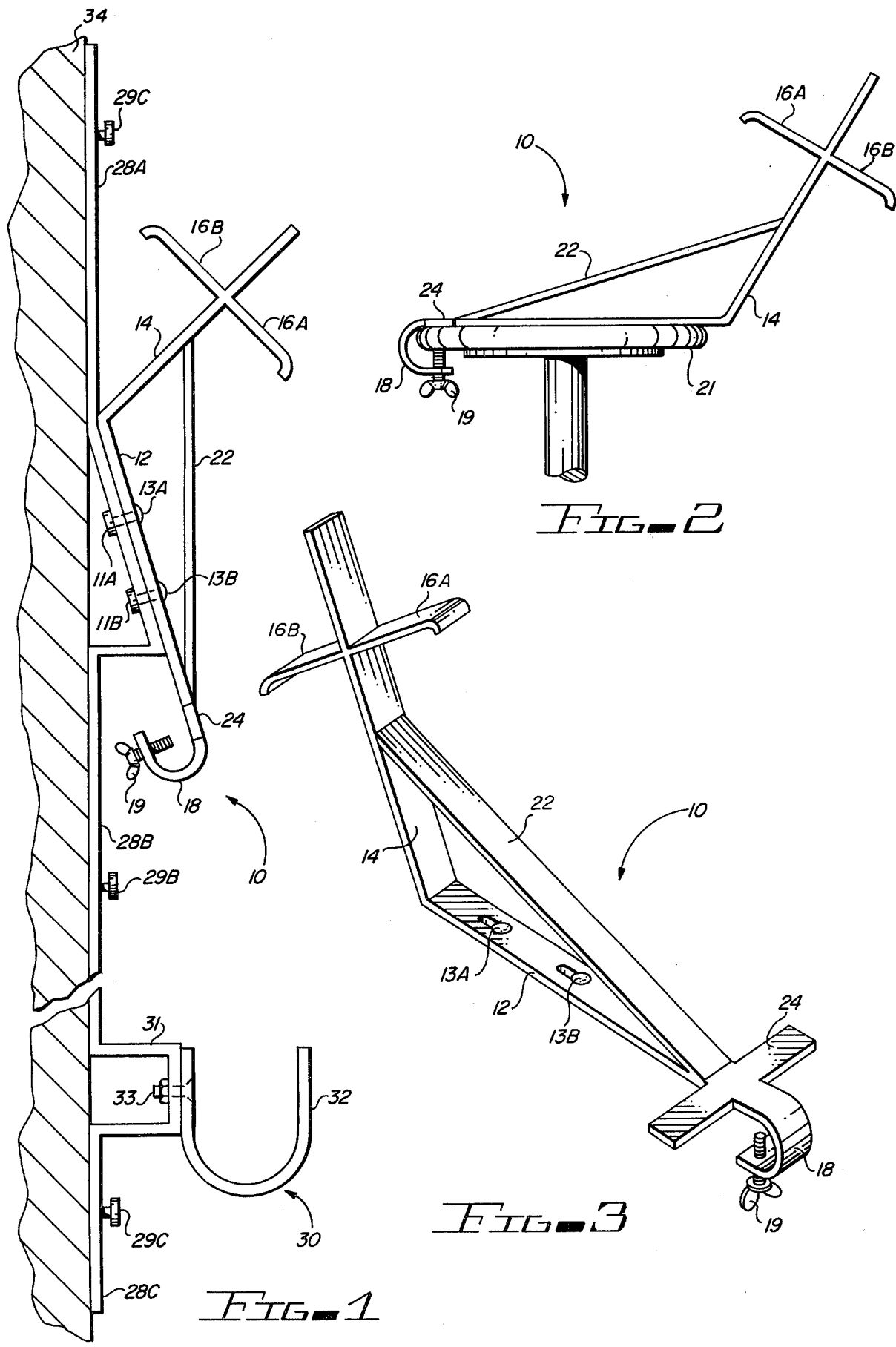

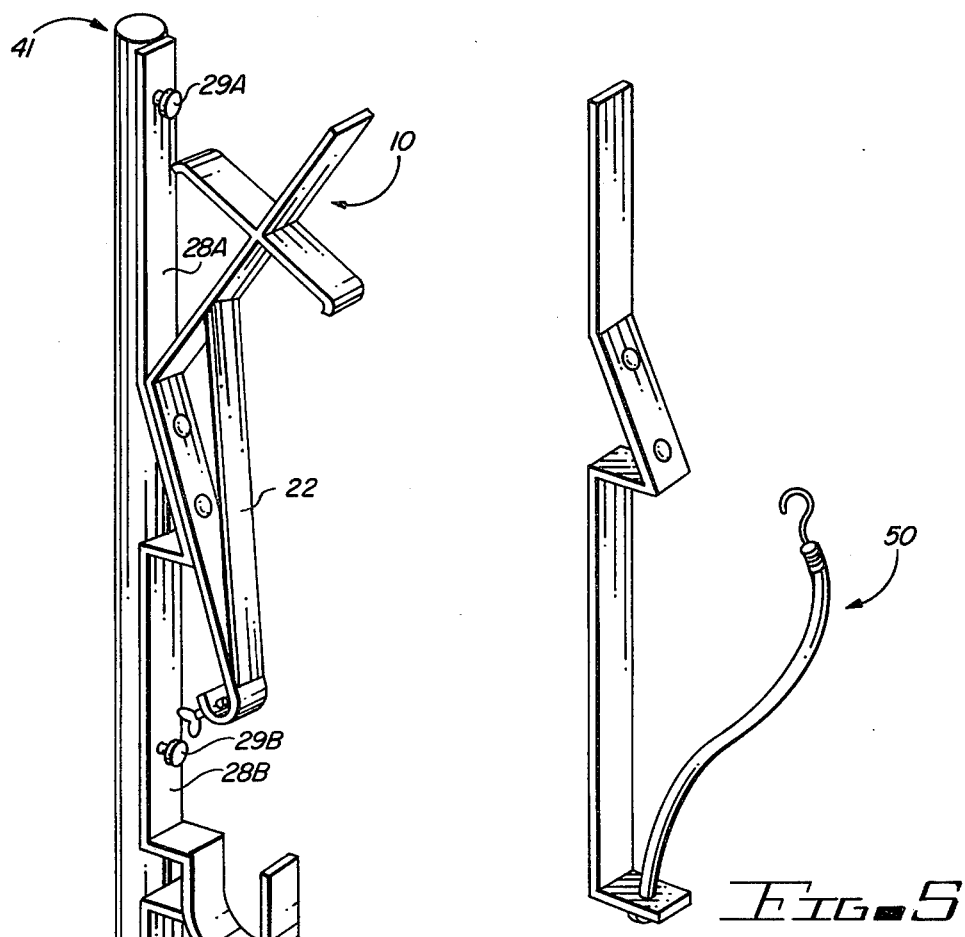
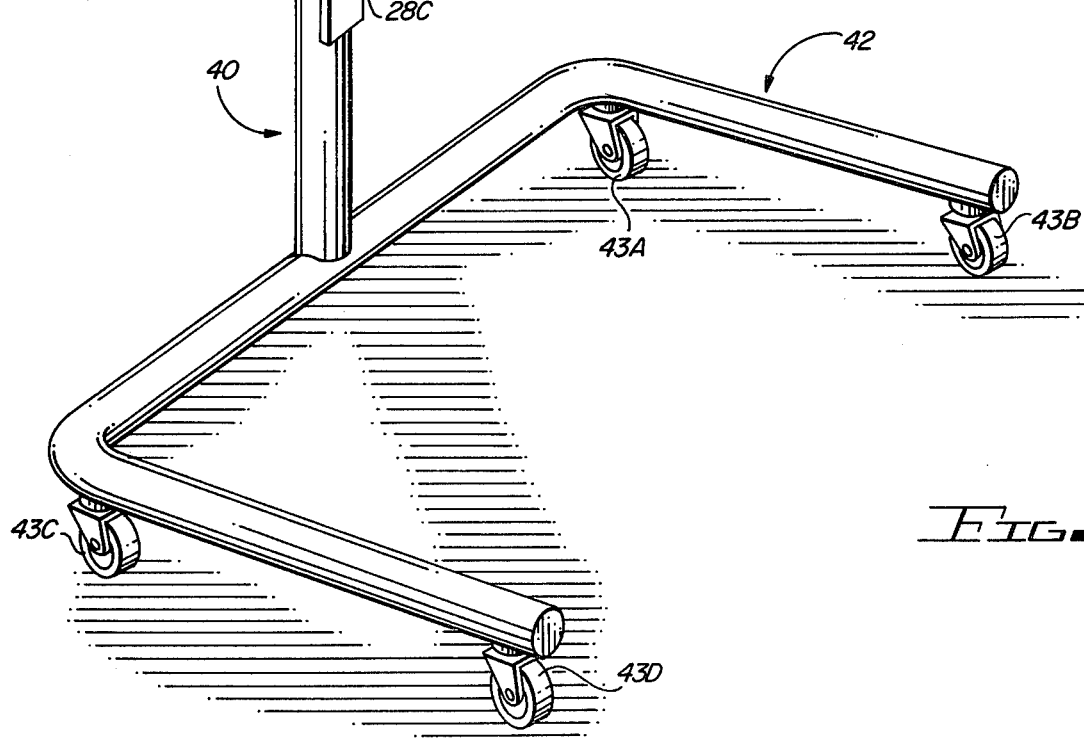

MUSICAL INSTRUMENT HOLDER FOR ATTACHMENT TO VERTICAL AND HORIZONTAL SURFACES

BACKGROUND OF THE INVENTION

1. Field of the Invention

This invention relates generally to holders for musical instruments, and, more specifically, to holders for holding large, heavy, cumbersome or easily dented musical instruments for either wall-mounted vertical storage, or upon a rolling stand or a horizontal surface such as a bench or chair.

2. Description of the Prior Art

In the past, wall storage of large, heavy, cumbersome or easily dented instruments, such as the Sousaphones and Tubas carried in marching bands, was accomplished by the use of fixed or permanently wall-mounted holders. Alternatively, these instruments were stored upon rolling stands or in large cases. Performers carry such instruments during marching performances, or play while seated in bleachers or stands. While playing, the instrument is supported upon the player's body. Damage is risked by placing the instrument directly on a seat or floor surface during periods when not actually playing the instrument, which is often constructed of soft, easily scratched or marred metal. Such instruments are generally built for both functional acoustic performance and ease of carrying, without regard for unsupported placement on horizontal surfaces.

While the musical instrument may be rested in its own padded carrying case, such cases are themselves large and cumbersome, and the instrument must be disassembled in order to be placed therein. These cases are not suited to the rapid-access or storage required during actual performances.

A need existed during performance for a rapid access portable holder capable of secure instrument support which could either be temporarily attached to a chair, bench, or similar horizontal surface near the seated performer or converted for attachment to a wall or a rolling stand.

Since such a convertible or adaptable holder must function, alternately, for vertical wall or stand mounting; or horizontal bench mounting, a need existed for a holder that is equally capable of secure musical instrument support in both axes.

BRIEF DESCRIPTION OF THE DRAWINGS

FIG. 1 is a side elevational view of the holder of this invention shown attached (vertically) as a wall-mounted holder.

FIG. 2 is a side view of the holder, shown attached (horizontally) to a bench, chair or stool.

FIG. 3 is a perspective view of the holder in which the eyelet means of attachment to the wall mount is shown.

FIG. 4 is a perspective view of the holder affixed to a rolling stand.

FIG. 5 is a perspective of an alternate embodiment of the wall-holder showing flexible secondary holding means.

SUMMARY OF THE INVENTION

In accordance with one embodiment of this invention, it is an object to provide an easily portable musical instrument holder capable of temporary attachment to a chair, bench or similar horizontal surface convenient to the performer.

It is another object to provide a musical instrument holder that will permit ready access to the instrument in placement and removal during a musical performance or pauses between performances.

It is still another object to provide a musical instrument holder capable of supporting large, heavy, cumbersome, easily dented or marred musical instruments.

It is yet another object to provide a musical instrument holder that will distribute the weight of the musical instrument on the horizontal surface on which the holder is mounted.

It is also another object to provide a musical instrument holder with lateral stability.

It is another object to provide a musical instrument holder tha can be either wall-mounted or rolling-stand mounted and still capable of supporting large, heavy, cumbersome, easily dented, or marred musical instruments.

It is a further object of this invention to provide a portable or rolling stand musical instrument holder that can be convertible into a wall-mounted holder for economy and to assure that the holder remains with the instrument in storage.

Still another object is to provide a musical instrument holder that has a holding surface capable of proper musical instrument support in either horizontal or vertical usage.

Yet another object is to provide that the musical instrument holding surfaces be of a quality which reduces or minimizes the risk of scratching the instrument.

It is a further object to provide a musical instrument holder constructed or surfaced so as to minimize the risk of scratching or gouging the horizontal surface upon which instrument weight is distributed.

It is a further object to provide a musical instrument holder having means by which the holder is attached or clamped which is constructed or surfaced so as to minimize the risk of scratching or gouging the horizontal surface at the point of attachment or clamping.

It is yet another object to provide a musical instrument holder having means whereby varying sizes and shapes of instruments may be supported.

DESCRIPTION OF THE PREFERRED EMBODIMENTS

In accordance with one embodiment of this invention, a holder is disclosed which comprises a plurality of holding surfaces, one or more of which provides instrument support in the horizontal position and one or more of which provides instrument support in the vertical position. When used in the horizontal position, the holding surface extends beyond one side of the chair, bench or other horizontal surface, permitting the large tubing portion of the instrument to hang freely therefrom, while the end of the holder opposite from the holding surface is clamped or otherwise affixed to the opposite edge of the chair, bench or other horizontal surface. A member perpendicular to the clamping member and in the same plane as the weight-bearing horizontal surface, provides lateral stability. Instrument weight is distributed along the horizontal weight-bearing member in proportion to the relative moment arms from the clamping means to the instrument holding surface and from the clamping point to the point of contact with the chair, bench or other horizontal surface. A reinforcing member provides rigidity.

When used vertically for storage, eyelet holes in the holder engage corresponding rivets in an adapter member affixed to a wall or to a rolling stand. The eyelets provide secure attachment when bearing instrument weight, but permit removal of the holder from the wall mount or rolling stand by sliding the holder vertically and pulling away from the mount or stand.

In accordance with another embodiment of this invention, an additional instrument holding surface or flexible tie-down strap is incorporated into the wall mount, providing added stability by grasping the lower portion of the instrument tubing.

In accordance with yet another embodiment, a fixed mount, dimensionally comparable to the wall mount is attached to a rolling stand, permitting a heavy instrument thus supported to be wheeled from one location to another, such as from a storage room to a concert stage, and there used during a perfomance as an alternative to utilization of a chair, bench or other horizontal surface.

In accordance with another embodiment, the instrument holding surfaces are covered with rubber, plastic, felt, cork or similar materials to minimize instrument abrasion or denting.

In accordance with another embodiment, the weight-distributing surface of the holder which contacts the chair, bench or other horizontal surface is covered with rubber, plastic, felt, cork or similar materials, and is dimensionally widened so as to distribute instrument weight over a larger surface, and with less risk of abrading or tearing soft or padded chairs, benches, or other horizontal surfaces.

In accordance with another embodiment, a broad contact means is interposed between the end of the clamping screw and the underside of the chair, bench or other horizontal surface so as to distribute contact pressure over a larger area and to reduce underside scarring or puncture.

In accordance with yet another embodiment, dimensional and angular adjustment means are substituted for the rigidly positioned holder, so as to allow the user to adjust the angle and degree of protrusion of the holding surface with respect to the weight-bearing surface.

The foregoing and other objects, features and advantages will be apparent from the following, more particular, description of the preferred embodiments of the invention, as illustrated in the accompanying drawings.

THE SPECIFICATION

Referring to FIG. 1, a Convertible Ready-Access Musical Instrument Holder is generally designated by reference number 10. The holder, in this embodiment is comprised of a weight bearing and distribution member 12; a neck member 14 coupled at a first end to the weight bearing member 12 and extending upwards at an angle therefrom; holding means 16A, 16B coupled to the neck, for retaining the musical instrument in at least two positions; clasp or clamp means 18, 19 coupled to the weight bearing member for securely fastening the weight bearing member 12 to a horizontal planar surface; and conversion means 28, 29, 11 for coupling the holder to a vertical surface 34, such as a wall or rolling stand. FIG. 1 also illustrates the embodiment of a secondary instrument support, 30, comprised of a clasp member 32, affixed via fastener 33 to a protruding portion 31 of the conversion means. The holder is affixed to the conversion means via fasteners 11A, 11B through eyelets 13A, 13B.

Referring to FIG. 2, the holder 10 is shown in side view clamped via clasp means 18, 19, to horizontal planar surface 21. Bending moment between weight bearing member 12 and neck 14 is supported by reinforcing member 22, which is in compression when weight is borne in the vertical holding mode, and in tension when weight is borne in the horizontal holding mode.

Referring to FIG. 3, a perspective view of the holder shows eyelet holes 13A, 13B which permits rapid attachment or detachment of the holder from the conversion means, and lateral stabilizing member 24, which resists torsion around the axis of the weight bearing member 12 when used in the horizontal mode.

Referring to FIG. 4, a perspective view shows the holder 10, and conversion means 28A, 28B, 28C, and 29A, 29B, 29C attached to the vertical member 41 of rolling stand 40, whose base 42 extends under the center of gravity of the supported musical instrument, and which rolls on casters 43A, B, C, D.

Referring to FIG. 5, a perspective view of an alternate embodiment is shown, incorporating a flexible tie-down means, 50, whereby the lower portion of the musical instrument may be grasped.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for holding a musical instrument comprising:

a narrow, elongated, flat, weight-bearing member for attachment to a supporting surface, a similarly-shaped narrow, elongated, flat, instrument-holding means coupled at one end to one end of said weight-bearing member and extending angularly therefrom, a first means mounted at the other end of the instrument-holding means for supporting the instrument in one of two positions, said first means comprises a flat, elongated member extending laterally across said instrument-holding means at a point spaced from said other end, clamping means attached to the other end of said weight-bearing member for detachably securing said weight-bearing member to a horizontal surface, an elongated engagement member for mounting on a vertical surface, said engagement member comprising a portion angularly positioned to the remainder of said engagement member for engaging with said weight-bearing member to properly support a musical instrument supported by said instrument-holding means, eyelet means spacedly formed in said weight-bearing member, means means mounted on said portion for detachably connecting with said eyelet means for holding said apparatus on said engagement member, and an instrument support means coupled to one end of said engagement member near said instrument support means for engagement at the other end with the instrument for holding it on said engagement member.

2. The apparatus set forth in claim 1 in further combination with:
reinforcing means connected between said instrument-holding means and said other end of said weight-bearing member for resisting bending of the apparatus in either compression or tension conditions, depending upon vertical or horizontal mounting of the apparatus, and
a stabilizing means mounted on the other end of said weight-bearing member for resisting torsion around its axis when mounted on a horizontal surface.

3. The apparatus set forth in claim 1 in further combination with:
a flexible tie down means attached at one end to one end of said engagement member near said instrument support means for engagement at the other end with the instrument for holding it on said engagement member.

* * * * *

UNITED STATES PATENT AND TRADEMARK OFFICE
CERTIFICATE OF CORRECTION

PATENT NO. : 4,441,683
DATED : April 10, 1984
INVENTOR(S) : Richard G. Mayne

It is certified that error appears in the above-identified patent and that said Letters Patent is hereby corrected as shown below:

Column 4, Claim 1, line 28, delete "means" first occurrence.

Signed and Sealed this

Thirty-first Day of July 1984

[SEAL]

Attest:

GERALD J. MOSSINGHOFF

Attesting Officer

Commissioner of Patents and Trademarks